US012113680B2

United States Patent
Peng et al.

(10) Patent No.: US 12,113,680 B2
(45) Date of Patent: *Oct. 8, 2024

(54) REINFORCEMENT LEARNING FOR JITTER BUFFER CONTROL

(71) Applicant: Microsoft Technology Licensing, LLC, Redmond, WA (US)

(72) Inventors: Xiulian Peng, Beijing (CN); Vinod Prakash, Redmond, WA (US); Xiangyu Kong, Beijing (CN); Sriram Srinivasan, Sammamish, WA (US); Yan Lu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,992

(22) Filed: Dec. 30, 2022

(65) Prior Publication Data
US 2023/0138038 A1 May 4, 2023

Related U.S. Application Data

(63) Continuation of application No. 16/877,257, filed on May 18, 2020, now Pat. No. 11,558,275.
(Continued)

(51) Int. Cl.
*H04L 47/283* (2022.01)
*G06F 18/21* (2023.01)
(Continued)

(52) U.S. Cl.
CPC ............ *H04L 41/16* (2013.01); *G06F 18/214* (2023.01); *G06F 18/217* (2023.01); *G06N 20/00* (2019.01);
(Continued)

(58) Field of Classification Search
CPC .. G01S 7/417; G06K 9/00536; G06K 9/6256; G06K 9/6262; G06K 9/6271;
(Continued)

(56) References Cited

U.S. PATENT DOCUMENTS 10,965,806 B1 * 3/2021 Haggerty ............ H04M 3/2236
2020/0044955 A1 * 2/2020 Pugaczewski ...... H04L 41/5025
(Continued)

OTHER PUBLICATIONS

Jay et al., A Deep Reinforcement Learning Perspective on Internet Congestion Control, downloadable at http://proceedings.mlr.press/v97/jay19a/jay19a.pdf, 10 pages, 2019.*
(Continued)

*Primary Examiner* — Frank Duong
(74) *Attorney, Agent, or Firm* — Schwegman Lundberg & Woessner, P.A.

(57) ABSTRACT

Disclosed in some examples are methods, systems, and machine-readable mediums which determine jitter buffer delay by inputting jitter buffer and currently observed network status information to a machine learned model that is trained using a reinforcement learning (RL) method. The model maps these inputs to an action to compress, stretch, or hold the jitter buffer delay, which is used by a recipient computing device to optimize the jitter buffer delay. The model may be trained using a simulator that uses network traces of past real streaming sessions (e.g., communication sessions) of users. By training the model through reinforcement learning, the model learns to make better decisions through reinforcement in the form of reward signals that reflect the performance of each decision.

20 Claims, 7 Drawing Sheets

Related U.S. Application Data

(60) Provisional application No. 62/976,047, filed on Feb. 13, 2020.

(51) Int. Cl.
*G06F 18/214* (2023.01)
*G06N 20/00* (2019.01)
*H04L 41/14* (2022.01)
*H04L 41/16* (2022.01)
*H04L 43/087* (2022.01)

(52) U.S. Cl.
CPC .......... *H04L 41/145* (2013.01); *H04L 43/087* (2013.01); *H04L 47/283* (2013.01)

(58) Field of Classification Search
CPC .... G06N 3/006; G06N 3/0445; G06N 3/0481; G06N 3/084; G06N 7/005; G06N 20/00; G06V 10/454; G06V 10/82; H04J 2203/0076; H04L 25/0254; H04L 25/03165; H04L 41/145; H04L 41/16; H04L 43/0817; H04L 43/0852; H04L 43/0864; H04L 43/087; H04L 47/283; H04L 2012/5646; H04L 2012/5647; H04L 2012/5649; H04L 2012/5686; H04L 2025/03464; H04N 21/4662; H04N 21/4666
See application file for complete search history.

(56) References Cited

U.S. PATENT DOCUMENTS

2020/0074296 A1\* 3/2020 Singh ..................... G06N 3/044
2021/0012227 A1\* 1/2021 Fang ................... H04L 41/5067
2021/0158141 A1\* 5/2021 Taylor ..................... G06N 3/08

OTHER PUBLICATIONS

Mnih et al, Asynchronous Methods for Deep Reinforcement Learning, arXiv, 19 pages, Jun. 16, 2016.\*
Creusen et al., Control of jitter buffer size using machine learning, Technical Disclosure Commons, 7 pages, Dec. 6, 2017.\*
Tian et al., Deeplive: QoE Optimization for Live Video Streaming through Deep Reinforcement Learning, IEEE, 5 pages, 2019.\*
Huang et al., End-to-End Autonomous Driving Decision Based on Deep Reinforcement Learning, IEEE, 5 pages, 2019.\*
Huang et al., QARC: Video Quality Aware Rate Control for Real-Time Video Streaming via Deep Reinforcement Learning, arXiv, 10 pages, Oct. 27, 2018.\*
Bhattacharyya et al., QFlow: A Reinforcement Learning Approach to High QoE Video Streaming over Wireless Networks, ACM, 10 pages, Jul. 5, 2019.\*

\* cited by examiner

REINFORCEMENT LEARNING FOR JITTER BUFFER CONTROL

PRIORITY CLAIM

This application is a continuation of U.S. application Ser. No. 16/877,257, filed Jan. 18, 2020, which claims the benefit of priority, under 35 U.S.C. Section § 119 to U.S. Provisional Patent Application Ser. No. 62/976,047, entitled "REINFORCEMENT LEARNING FOR JITTER BUFFER CONTROL," filed on Feb. 13, 2020, which applications are hereby incorporated by reference herein in their entirety.

BACKGROUND

During media streaming over a network packets may be delivered with arbitrary delay. That is, the delay between a first and second packet may be different than a delay between the second and a third packet. This is called jitter. Without compensating for jitter, audio quality issues may be perceived by the recipient. For example, because the playback happens at a particular speed, gaps in the audio may be perceived when a next packet hasn't been received before playback of the previous packet completes. These effects may be especially prevalent where a part of the signal path between the sender of the media and the recipient travels through Wi-Fi or mobile networks.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
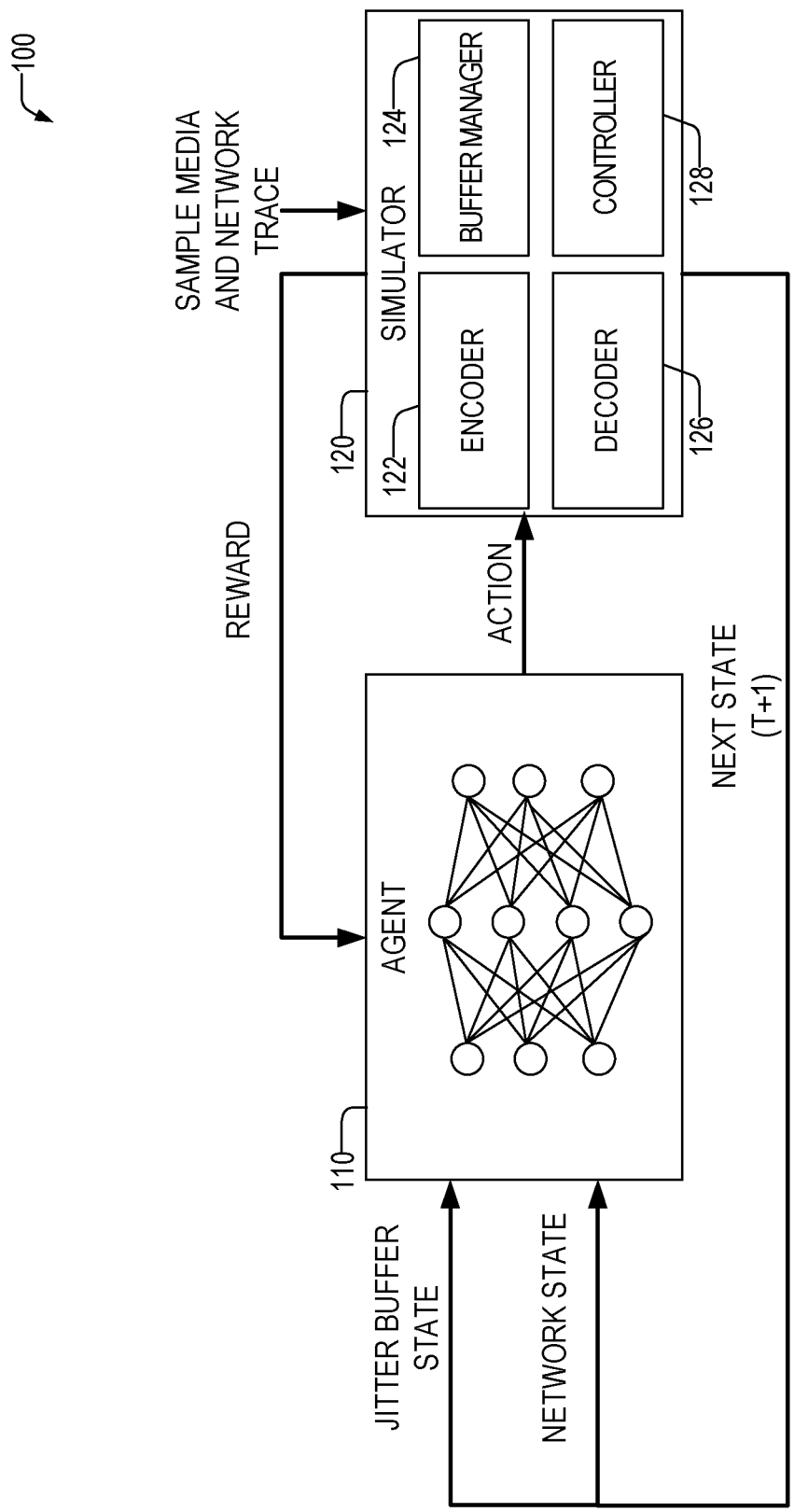
FIG. 1 illustrates a block diagram of a system for training a reinforcement learning model to make decisions on jitter buffer delay according to some examples of the present disclosure.

To deal with this jitter, communication programs typically utilize a jitter buffer to cope with variations in the delay of arriving packets and to achieve a continuous playout. The jitter buffer removes duplicate packets, re-orders packets that arrive out of order, repairs the stream in the event of packet loss (concealment), manages delay dynamically based upon current network congestion, and manages error correction. The delay introduced by the jitter buffer allows for additional packets to arrive before previously received packets are played back. This delay introduces latency from the point at which audio is sent and when it is played back.

Certain media streaming applications such as real-time communication applications (e.g., VoIP applications) demand a high level of interactivity which would be degraded by a long jitter buffer delay. On the other hand, a short delay could cause playback to proceed faster than packets are received and lead to gaps in the playback. Thus, proper jitter-buffer delay management seeks to ensure that the delay introduced by the jitter buffer is long enough to compensate for jitter caused by network conditions, but short enough so that the latency is not noticeable.

Typically, the jitter buffer delay is managed by stretching or compressing the playback time of media frames removed from the buffer. By stretching 10 ms of playback to 20 ms, it increases the length of time the remaining media frames stay in the buffer and increases the likelihood that additional frames arrive during that time. By compressing 10 ms of media playback to 5 ms, it decreases the length of time the remaining frames stay in the buffer and decreases the amount of frames in the buffer. Missing frames may be compensated through one or more concealment techniques. While techniques such as compression and stretching do allow for control of the jitter-buffer so as to minimize the effects of jitter, they also decrease the quality of the media experience relative to normal playback. If controlled properly, the degradation of the media playback quality relative to normal playback may be minimal and may be less than a degradation caused by jitter.

Delay optimization methods focus on improving the trade-off between latency and loss by exploiting the flexibility of allowing more playout jitter. The delay adjustment may be performed between talk spurts but also within talk spurts. The network delay is estimated from past statistics and used to adaptively adjust the playout time of voice packets. Certain rules are then employed to decide whether a stretch, compress or hold action should be taken according to the scheduled playout time. The efficiency of adaptive playout scheduling heavily relies on the accuracy of network delay estimation of future voice packets and the accuracy of the rules, for both inter-talk spurt and intra-talk spurt adaptation.

Some machine-learning based approaches may estimate the network delay characteristics of up-coming voice packets based on past statistics. One method utilizes an autoregressive model and feedforward/recurrent neural networks for the delay estimation of new talk spurts. Parameters of the model and neural networks are updated online once a talk spurt is experienced. Another example may use a hidden Markov model to predict the playout delay for the inter-talk spurt. Still another method utilizes a fuzzy trend analyzer system for network delay trend analysis in intra-talk spurt playout delay adaptation. Although machine learning based, these methods may still use many hand-crafted rules for decision-making and their performance highly depends on the delay estimation accuracy of some pre-programmed models.

Disclosed in some examples are methods, systems, and machine-readable mediums which determine jitter buffer delay by using jitter buffer and currently observed network status information to produce a jitter buffer action. For example, by inputting jitter buffer and currently observed network status to a machine learned model that is trained using a reinforcement learning (RL) method. The model maps these inputs to an action to compress the media frame (play it back in a shorter amount of time than normal), stretch the media frame (play the frame back in a longer amount of time than normal), or hold the jitter buffer delay (e.g., play the frame back at a normal amount of time), which is used by a recipient computing device to optimize the jitter buffer delay. The model may be trained using a simulator that uses network traces of past real streaming sessions (e.g., communication sessions) of users. During training, the decisions of the model (e.g., the "agent") are then used to calculate a reward. The reward is then used to calculate a loss function which is used to train the model. For example, the model may be a neural network and the loss function may be used to retrain the weights applied to the inputs to the neurons in one or more layers of the neural network. By training the model through reinforcement learning, the model learns to make better decisions through reinforcement in the form of reward signals that reflect the performance of each decision.

Generally, in a reinforcement learning context, an agent interacts with an environment. At each time step t, the agent observes a state $s_t$ and takes an action $a_t$. After this action, the environment transits to the next state $s_{t+1}$ and the agent receives a reward $r_t$. In some examples, the goal of learning in a reinforcement learning method is to maximize the expected cumulative discounted reward $E(\Sigma_{t=0}^{\infty} \gamma^t r_t)$, where $\gamma \in [0,1]$ is the discount rate.

FIG. 1 illustrates a block diagram of a system 100 for training a reinforcement learning model to make decisions on jitter buffer delay according to some examples of the present disclosure. The agent 110, in some examples, is a machine-learned reinforcement learning model such as a neural network that observes a state describing current jitter buffer states and network states (e.g., packet histories). The agent 110 outputs an action in response to these inputs. Possible actions may include a stretch, hold and compress action for frames of a current playback time period.

The environment is implemented through a simulator 120. To simulate the real system, in some examples network traces from media streaming sessions, such as calls between users in a real-time communication session such as MICROSOFT TEAMS® and/or SKYPE® are input to the simulator 120. Each row in the network trace describes information about one or more packets sent as part of a captured streaming session. The network trace may include information about the packets sent and/or received including timestamps and packet sizes; information about the network performance including lost packets, delayed packets, latency, bandwidth, loss, reordering, and the like. The network traces may be measured at the receiving side but may also contain information about the sending side. In some examples, the network trace may include information about the contents of the packets including the type of media; encoding type; encoding information such as a playback duration of the media encoded in the packet; contents of the packets (captured with user's permission); and the like. The packets recorded in the network trace may arrive out of order and with various jitters. The traces may be collected from streaming sessions held on a variety of different network types and between a variety of different computing devices. For example, traces may be collected on streaming sessions held over wired networks, Wi-Fi and mobile networks and on various clients including PC, Tablet and mobile phone. By collecting a diverse training data set, the model may robustly handle a wide variety of expected network conditions. In some examples, the network traces may be split into training, validation and test sets.

The simulator 120 may include a controller 128; an encoder 122; a decoder 126; and a packet buffer manager 124. The controller 128 reads the input network traces and instructs the encoder 122 to encode media frames from sample media files corresponding to the packets in the traces. The encoded media properties (e.g., playback length, encoded size, encoding type) may be the same as indicated by the properties in the network trace. The controller 128 may place audio frames in a jitter buffer according to the timestamps in the network trace to simulate observed network jitter from the network traces. In other examples, to fully simulate the network, the simulator 120 may create packets and place them in a packet buffer. The controller 128 may then read the contents of those packets (media frames) into the jitter buffer according to the timestamps of the network traces.

The buffer manager 124 may manage the jitter buffer (and in some examples, a packet buffer). At each time step, the agent 110 sends an action to the simulator 120 to control the current jitter buffer delay for the current media frame (e.g., audio frame, video frame, etc.). A media frame in some examples corresponds to payload from one or more packets. As noted, the actions include compress, stretch, and normal playback. Controller 128 manages the playback of the media from the jitter buffer along with the decoder 126 (which decodes the encoded media frame) in accordance with the action indicated by the agent 110. The controller 128 may also apply any concealment actions indicated by the network traces. The controller 128 may generate a feedback signal as a reward to the agent 110 that shows how good the current action performs. Specifically, it measures the buffering delay and impact on the reconstructed audio quality. The agent 110 receives this reward signal and uses it, along with a value determined by the agent 110, and the selected action for training the network.

To measure the impact of jitter on audio quality, an objective metric called Network Poor Call Ratio (NPCR) is defined that maps perceived audio quality to parameters related to concealment, timescale modification and latency. The reward is calculated by the controller 128 using principles of the NPCR (the actual reward function used is given later when discussing FIG. 2). NPCR has been developed using technical metrics and subjective user preference ratings collected from users of a real-time communication system in real calls. This metric has a high correlation with subjective user ratings, which combines the cost of latency as well the cost of concealment/stretch/compress actions in a single measure. Given a network trace, the agent network is trained to predict jitter buffer actions for each frame such that NPCR for the entire trace is minimized.

Specifically, NPCR uses a logistic regression to map perceived audio quality to parameters related to concealment, timescale stretch modification and latency as below.

$$\text{NPCR} = 1/(1 + e^{(c1 - \omega_d \cdot m_d - \omega_c \cdot \rho_c - \omega_s \cdot \rho_s - \omega_r \cdot m_{rtt})}).$$

$m_d$, $\rho_c$, $\rho_s$ and $m_{rtt}$ are the average jitter buffer delay, ratios for concealment, ratios for timescale stretch actions and round-trip time (RTT), respectively. $m_d$ and $m_{rtt}$ are measured in milliseconds. $\omega_d$, $\omega_c$, $\omega_s$ and $\omega_r$ are weights for them and $c_1$ is a constant. From the equation, lower $m_d$, $\rho_c$ and $\rho_s$ values lead to a lower NPCR and better perceived experience.

Figure 2:
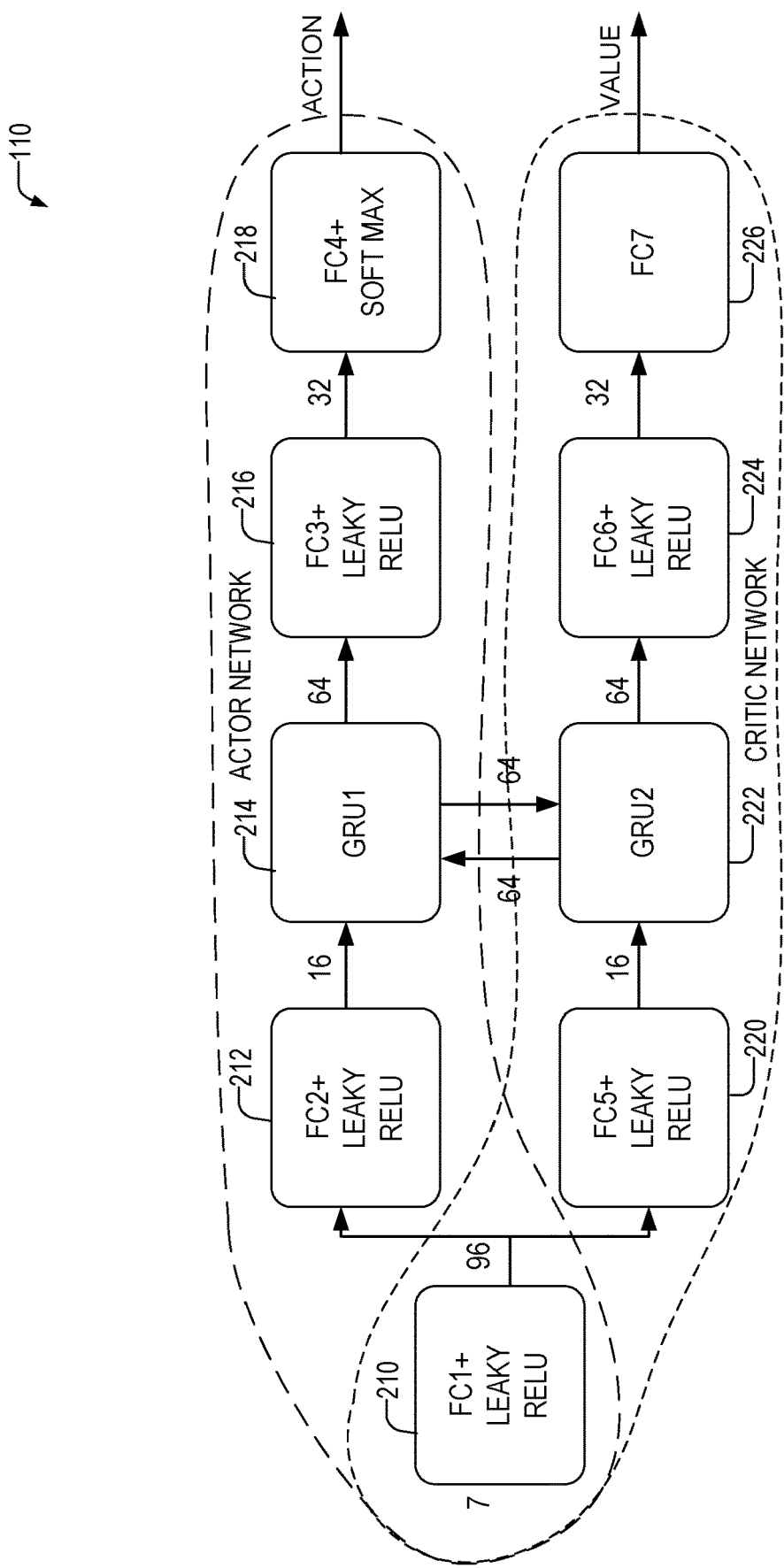
FIG. 2 illustrates a block diagram of an example agent according to some examples of the present disclosure.

Turning now to FIG. 2, a block diagram of an example agent 110 is shown according to some examples of the present disclosure. In some examples, the agent 110 may be an asynchronous actor-critic (A3C) reinforcement learning model, such as a Reinforcement Neural Network (RNN). There are two parts, an actor network that estimates a policy $\pi(s_t, a_t)$ with a set of action probability outputs and a critic network that estimates a value function $V^\pi(s_t)$ showing how good the state is to be in. The agent 110 will use the value estimate along with the reward calculated by the simulator to calculate a loss function that will be used to update the RNN. In some examples, both the actor network and the critic network are updated, in other examples the actor network is updated but not the critic network, and in yet other examples, the critic network is updated but not the actor network. In some examples, multiple worker agents may be used with independent experiences and synchronous network update to speed up the training process and boost the performance. FIG. 2 is one example network structure with example inputs and connections, but one of ordinary skill in the art with the benefit of the present disclosure will appreciate that other network structures may be utilized.

Agent 110 may include an actor network featuring layers 210, 212, 214, 216, and 218. In some examples, the inputs to the model (which starts at layer 210) consist of a current jitter buffer delay $jb_t$, current received frames in jitter buffer $recv_t$ (e.g., for example, the total playout time of all frames in the buffer), whether the current frame is newly received $nr_t$, whether current frame is concealed or not $c_t$, network delay of the current frame $n_t$, total delay of the current frame (playout time-sending time) $b_t$, and the action taken in the previous step $a_{t-1}$. Apart from $nr_t$, $c_t$ and $a_{t-1}$, the other four components are measured in milliseconds for conformance.

Layer 210 in some examples may be a Fully Connected (FC) 1+ layer with 7 inputs (as described above) with a leaky rectified linear unit (ReLu) activation function. A ReLu is an activation function of a neural network that maps inputs of a neuron of a neural network into an output. A standard ReLu is mathematically defined as y=max(0,x). That is, the output is zero if the input is less than zero, otherwise the ReLu function outputs the input (y=x). A leaky ReLu function, by contrast, has a small slope for negative values. For example, where x<0, the leaky ReLu may output y=0.01x and where x>=0, y=x. The purpose of layer 210, in some examples, is to extract features from the input state without memory and pass these to the next layers in both the actor and critic network. As noted in FIG. 2, layer 210 takes seven inputs and passes 96 outputs to the next layers. The numbers on the lines in FIG. 2 indicate the number of inputs to a particular layer and the number of outputs. The number next to the FC or GRU is an identifier (e.g., FC1, FC2, FC3, FC4, FC5, FC6; GRU1, GRU2) to distinguish each layer, and the "+" indicates an additional activation unit or soft max unit.

After that, two individual paths are executed to estimate the policy and the value, respectively. On the actor network side (policy estimation), layer 212 of the actor network takes the 96 outputs of layer 210 as input and produces 16 outputs. Layer 212 is a FC2+ Leaky ReLu. The 16 outputs of layer 212 is then input to layer 214 which produces 64 outputs. Layer 214 is a gated recurrent unit (GRU)1. The output of the layer 214 is then input to layer 216 which is a FC3+ Leaky ReLu layer which produces 32 outputs. The outputs of layer 216 is then input to the layer 218. Layer 218 is a FC4+ Softmax. A SoftMax is a function that takes as input a vector of K real numbers and normalizes it into a probability distribution consisting of K probabilities proportional to the exponentials of the input numbers.

Critic network, which may be used for training purposes may include layer 210, a FC5+ Leaky Relu layer 220, GRU2 layer 222, FC6+ Leaky ReLu layer 224, and FC 7 layer 226. The critic network may not be present and/or used in the model is used after training. In some examples, layers 214 and 222 may have a mutual information sharing scheme between their hidden states for better performance. The output of layer 210 may be input to a FC5+ Leaky ReLu layer 220, which may output 16 values to a layer 222 which is a GRU2 layer. Layer 222 may output 64 values which is then input to layer 224 which is a FC6+ Leaky ReLu, which outputs 32 values to a FC7 layer 226. FC7 layer 226 outputs a scalar value (without a ReLu or softmax unit).

In some examples, critic network may also be used during execution on actual data during a media streaming session. For example, the critic network may produce the value which is then used (as explained below) to refine the actor network and/or critic network. For example, the value and a reward signal may be used to refine the model. In other examples, one or more of the value, the jitter buffer state, the network state, previous decision, other inputs to the model, or results from the action that are taken from real-world usage may be used to refine the actor and/or critic model. For example, by using backpropagation. In some examples, the backpropagation is performed by the computing device on which the model is executing. In other examples, the value, the jitter buffer state, the network state, previous decision, and other inputs to the model as well as results from the action that are taken may be sent to another computing device, such as a cloud-based computing device, which may update the model. In these examples, the other computing device may use data sent by multiple users of the model to refine the model. The updated model may then be sent back to computing devices which use the model, which may begin using the updated model upon receipt. The model in some examples may be updated contemporaneously with the usage of the model.

While a five-layer RNN is illustrated with various structures and interconnections, it will be appreciated by one of ordinary skill in the art that more or fewer layers may be used and that different activation functions and interconnections may also be utilized.

The output policy to the actor network includes three action options: stretch, hold, or compress for the current pulled frame to control the jitter buffer delay. The stretch action increases latency in the buffer by performing timescale modification on the media (e.g., speech), e.g., generating 30 ms of playback from a 20 ms bitstream. The compress action reduces latency in the buffer, e.g., by generating 10 ms from a 20 ms bitstream. The hold action corresponds to no increase or decrease in latency. The controller is expected to perform a stretch action if network jitter is expected to increase, a compress action if jitter is expected to decrease and a current jitter buffer delay is high, and a hold action if no change is expected in network jitter. In our experiment, an action a is mapped to the latency modification $l_a$ by half of the frame as below.

$$ns_a = \begin{cases} \frac{L}{2}, & a \text{ is stretch} \\ 0, & a \text{ is hold} \\ -\frac{L}{2}, & a \text{ is compress} \end{cases}$$

L denotes the duration of current pulled frame. It should be noted that the action is not limited to take three discrete levels. In some examples, the action may be a continuous value or multiple discrete levels for finer control.

To optimize to NPCR, the instant reward at time t is designed accordingly as a weighted combination of three factors, i.e. jitter buffer delay, concealment and stretch actions. Specifically, it is $$r_t = c_2 - \omega_d \cdot \frac{n_{d,t+T}}{nf_{d,t}} - \omega_c \cdot \frac{n_{c,t+T}}{nf_t} - \omega_s \cdot \frac{n_{s,t}}{nf_t} \quad (3)$$

$n_{d,t+T}$ is the jitter buffer delay and $n_{c,t+T}$ is the number of concealed frames—both measured for the next pull time interval (t+T, t+2T). $n_{s,t}$ is the number of stretched frames during the current time interval (t, t+T). $nf_{d,t}$ is the total number of frames pushed into the jitter buffer until t. $nf_t$ is the total number of received frames. Both $n_{d,t+T}$ and $n_{c,t+T}$ are measured for the next time period while $n_{s,t}$ is measured for the current time period because both the jitter buffer delay and the number of concealed frames for a next time period is dependent on the consequences of the current action $a_t$. However, the consequences of the current action on audio quality of the current time period is measured by $n_{s,t}$—thus that is measured for the current time period. In some examples, current jitter buffer delay and concealment information are taken as the input to get $a_t$ so they are not used as a part of $r_t$. T is 20 ms for an output frame. $c_2$ is a constant bias to give a positive reward when $$\frac{n_{d,t+T}}{nf_{d,t}}, \frac{n_{c,t+T}}{nf_t} \text{ and } \frac{n_{s,t}}{nf_t}$$

are equal to zero. $\omega_d$, $\omega_c$ and $\omega_s$ are the same as in the NPCR equation. It should be noted that although the impact of compress actions on perceived audio quality are excluded in this reward equation, in some examples, the simulator may restrict the number of consecutive compress actions that are allowed to ensure a smooth playout quality.

In some examples, the loss function used to update the model and consists of three parts, i.e. the policy loss $D_{policy}$, the value loss $D_{value}$ and the entropy $D_{entropy}$ as below $$D_{policy} = -\log \pi(a_t|s_t; \theta)A_t,$$

$$D_{value} = [R_t - V^\pi(s_t)]^2,$$

$$D_{entropy} = \Sigma - \pi(a_t|s_t; \theta)\log \pi(a_t|s_t; \theta),$$

where $A_t = R_t - V^\pi(s_t)$ is the advantage function measuring how much better the actions turn out to be than expected. $R_t$ is the discounted reward given by $R_t = E(\Sigma_{i=t}^{\infty} \gamma^{i-t} r_i)$. The entropy loss serves as a regularization for the policy network, where a larger entropy implies more exploration and thus a small entropy is penalized. The final loss function is $$D_{loss} = \lambda_p * D_{policy} + D_{value} - \lambda_e * D_{entropy}$$

The weights $\lambda_p$ and $\lambda_e$ may be determined by experimentation.

Figure 3:
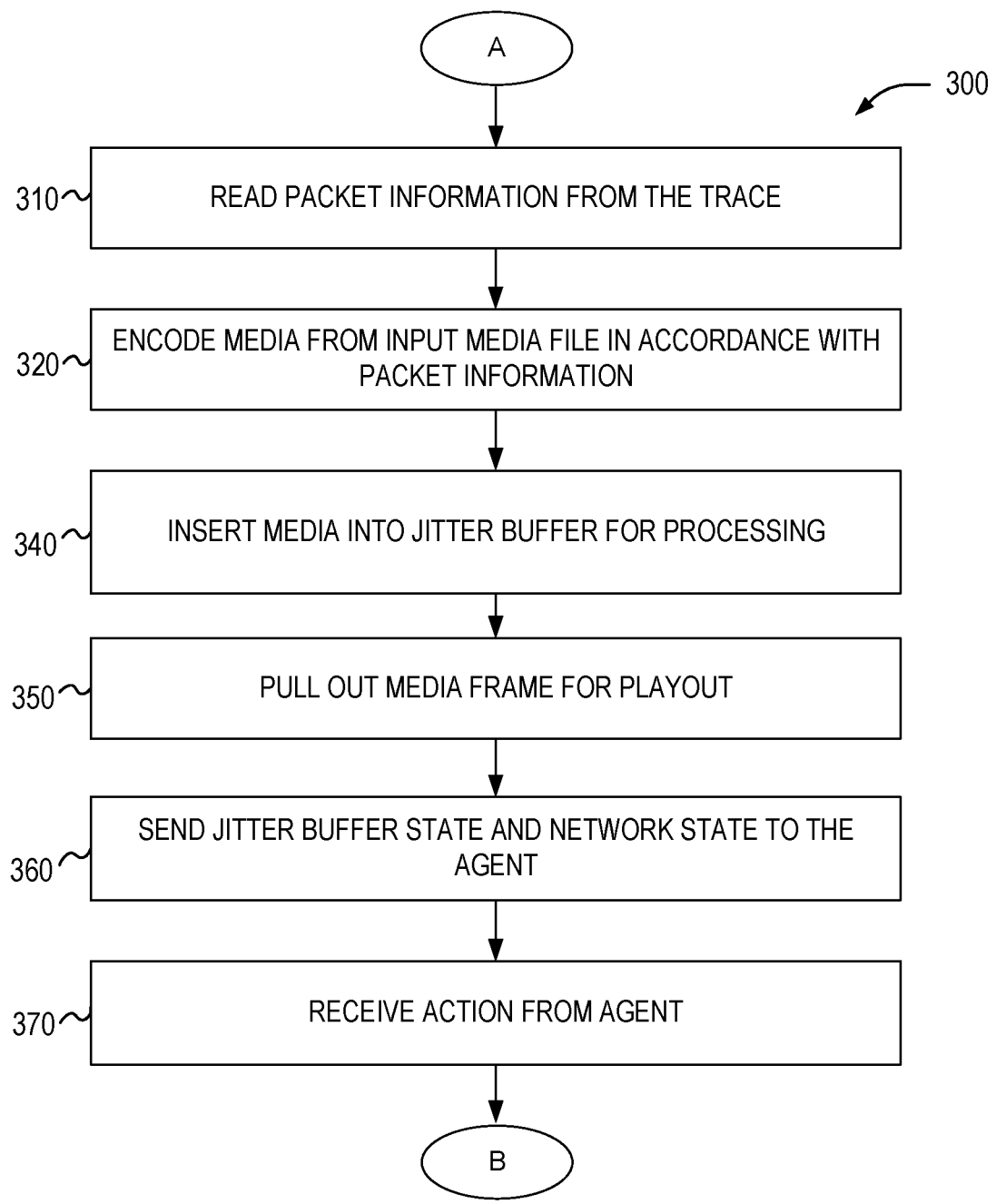
FIG. 3 illustrates a flowchart of a method of training a reinforcement learning model for use in controlling a jitter buffer delay of a streaming session according to some examples of the present disclosure.

FIG. 3 illustrates a flowchart of a method 300 of training a reinforcement learning model for use in controlling a jitter buffer delay of a streaming session according to some examples of the present disclosure. At operation 310, the simulator may read packet information from a network trace. As previously described, the network trace may be information about packets transmitted and/or received from a real streaming session. Example sessions include video streaming, audio streaming, audio/video streaming, and the like. For example, a real-time communication session such as a SKYPE® call or meeting, a TEAMS® call or meeting, and the like. The network trace may include information about the packets sent and/or received including timestamps and packet sizes; information about the network performance including lost packets, delayed packets, latency, bandwidth, loss, and the like. In some examples, the network trace may include information about the contents of the packets including contents of the packets (captured with user's permission), type of media, encoding type, encoding information such as a playback duration of the media encoded in the packet; and the like.

At operation 320 the simulator may encode media from input media files in accordance with the packet information from the network trace read at operation 310. For example, the media may be audio, video, audio/video, or the like. The media may be a sample media file and may be encoded according to the packet, network, and media information of the packet trace such that the encoded media may be a same size, encoding type, and the like as the packet that was the subject of the trace.

At operation 340, the encoded media frame may be inserted into the jitter buffer for processing. As noted, in some examples, the system may also construct packets with the media frame as a payload. Those packets may be pushed into a packet buffer that is then pulled out according to the arrival time of the packet according to the network traces. In other examples, and as shown in FIG. 3, the media frames are created and pushed into the jitter buffer at the arrival time in the network traces (with or without packetizing them). One or more of these operations may happen at the time indicated by the network trace as the network trace may record the time the packet was received (e.g., placed in the packet buffer) and the time the media was placed in the jitter buffer. In some examples, the media is decoded before being placed in the jitter buffer for playback. At operation 350, the media frame may be pulled out of the jitter buffer for playout. For example, each time interval (e.g., 20 ms), a particular playback duration (e.g., 20 ms) of media is pulled from the jitter buffer. If media is missing, the system may perform a concealment operation.

At operation 360, the jitter buffer state, network state, and previous action are sent to the agent. The network state may be a simulated network state calculated based upon the packet traces. The simulated network state may be a simulated network delay. The jitter buffer state may be a current jitter buffer delay, current received frames in the jitter buffer, total delay of the next media frame, whether the next media frame is concealed or not, whether a next media frame is newly received, and a previous action taken. The agent then feeds the inputs to the first layer of the network, which then produces output according to the weights on the neurons and the output of the activation function. These outputs are then sent to the next layer and so on, until the last layer produces one or more outputs corresponding to the decision. In some examples, the outputs may be a specific decision (stretch, hold, compress). In other examples, the outputs may be probabilities—that is, a probability that each of the actions is the best action given the inputs. In these examples, the output with the highest probability may be chosen. At operation 370, the action chosen may be received from the agent.

Figure 4:
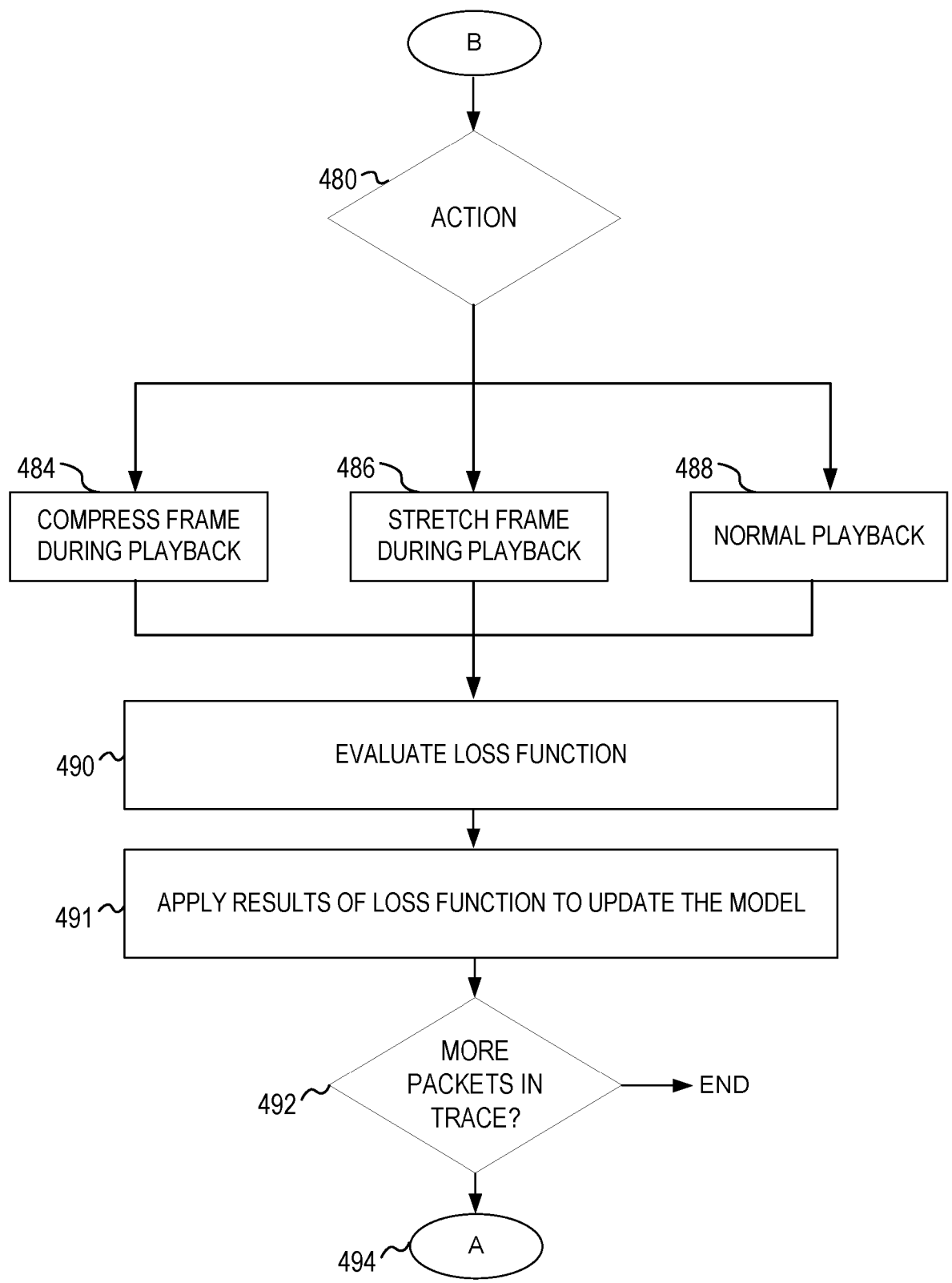
FIG. 4 illustrates a continuation of the flowchart of FIG. 3 according to some examples of the present disclosure.

Flow proceeds to FIG. 4, which illustrates a continuation of the flowchart of the method of FIG. 3 according to some examples of the present disclosure. At operation 480, depending on the action returned by the agent (e.g., agent 110), the simulator may decode the frame, play the frame back and may: compress the frame during playback (or simulated playback) at operation 484, stretch the frame during playback (or simulated playback) at operation 486, or play the frame back at normal playback (or simulated playback) at operation 488.

At operation 490, a loss function is evaluated. As previously described, the loss function may be a product of the instant reward, the value generated by the critic network and the like. For example, the system may calculate:

$$D_{policy} = -\log \pi(a_t|s_t; \theta)A_t,$$

$$D_{value} = [R_t - V^\pi(s_t)]^2,$$

$$D_{entropy} = -\Sigma - \pi(a_t|s_t; \theta)\log \pi(a_t|s_t; \theta)$$

$$D_{loss} = \lambda_p * D_{policy} + D_{value} - \lambda_e * D_{entropy}$$

The loss value may then be used to update the policy network by using techniques such as backpropagation at operation 491.

At operation 492, a determination is made as to whether there are more packets to analyze in the trace. If not, then processing ends. Otherwise, at operation 494, processing returns to operation 310 of FIG. 3.

Figure 5:
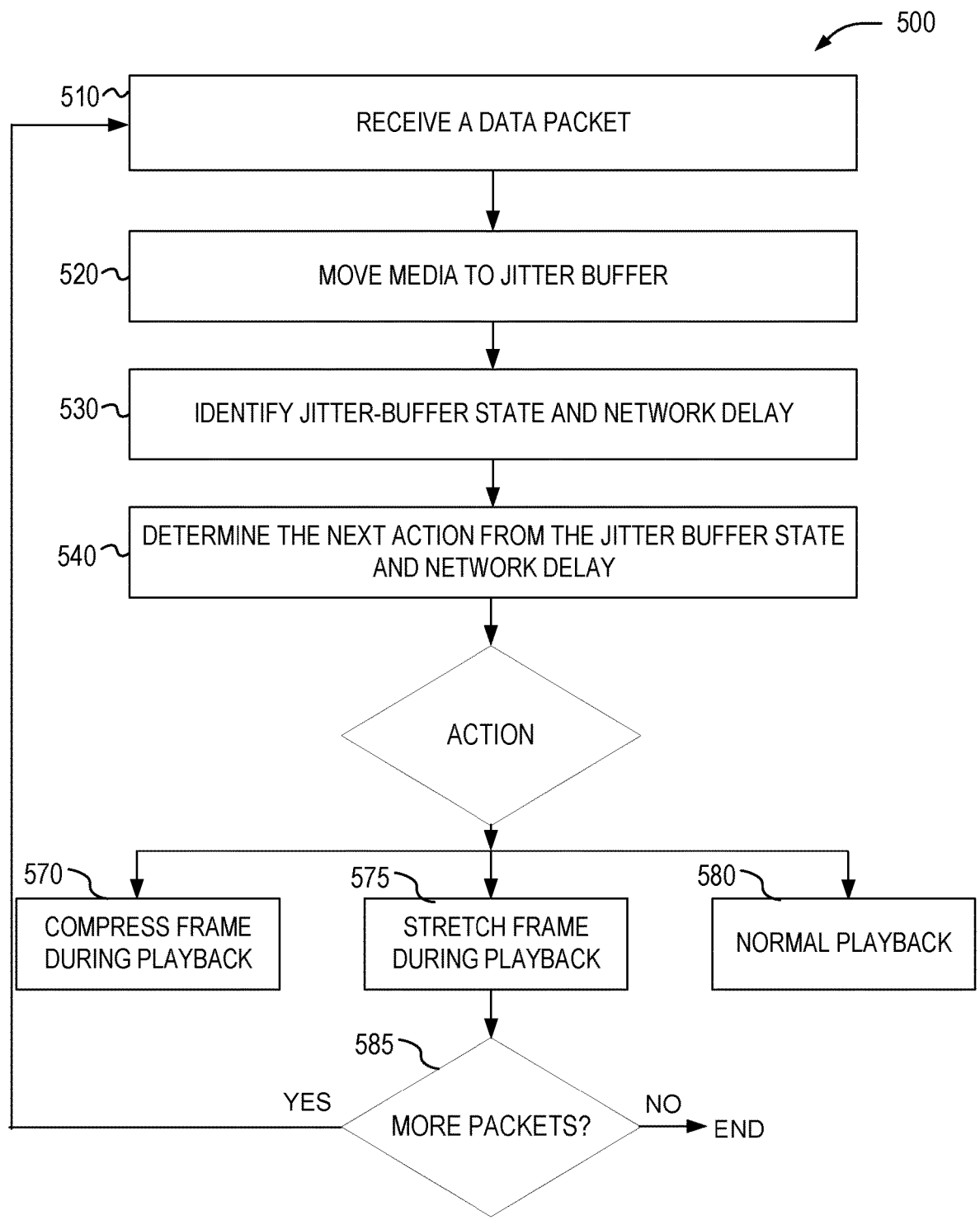
FIG. 5 illustrates a flowchart of an example method of adjusting a jitter buffer delay according to some examples of the present disclosure.

FIG. 5 illustrates a flowchart of an example method 500 of adjusting a jitter buffer delay according to some examples of the present disclosure. The model has already been trained and is operating on a live media streaming session. In some examples, a media streaming session may be the transmission of audio, video, audio video, and the like to a recipient over a network. The media streaming session may be a real-time or near real-time session in which the media is transmitted as it is generated or shortly thereafter. For example, a user may speak into a capture device which may record audio, video, or audio video which is then encoded, packetized, and sent for transmission concurrently with its capture. The media-streaming session may be a conversation or phone call, such as a VoIP call, an online meeting, or the like.

At operation 510, the receiver may receive a data packet from a sender, the data packet may have a payload comprising encoded media data. In some examples, the receiver may be an endpoint device which is to output the media. In other examples, the receiver may be a network server. For example, communication servers for real-time communications session may have a jitter buffer in the server as the server mixes audio and/or video from multiple participants and then sends that mixed audio and/or video to recipients. In some examples, the data packet may be placed in a received packet buffer.

At operation 520, one or more media frames with media data may be placed into the jitter buffer. For example, a frame may comprise media data from one or more packets. The frame may be placed into the jitter buffer as received or may be pulled from a separate packet buffer periodically to keep the jitter buffer full. If media data is not available for the next playout time period, then a concealment action may be taken. At operation 530 a current jitter-buffer state and network delay may be identified. For example, a current jitter buffer delay, current received frames in the jitter buffer, whether the current frame is newly received, whether current frame is concealed or not, network delay of the current frame, total delay of the current frame (playout time-sending time), and the action taken in the previous step.

At operation 540, the next action may be determined from the jitter-buffer state and network state (e.g., network delay). For example, the jitter-buffer state and network state (e.g., a network delay) may be input into the model at operation 540. The jitter-buffer state may include a current jitter buffer delay, current received frames in the jitter buffer, total delay of the media frame, whether the media frame is concealed or not, whether the media frame is newly received, and a previously taken action. The model may be a reinforcement learning model, such as a neural network that was trained using reinforcement learning methods (such as an A3C algorithm). The model may comprise data structures which describe the layers of the model and the weights associated with each layer. Each layer may also have an activation function of the neurons within that layer. The model may apply the inputs to a first layer of the model. The inputs may be weighted according to one or more input weights. The output of the first layer may be calculated using the inputs (as modified by the weights) and the activation function. The output of the first layer is then the input to the next layer, and so on. The output of the model may then indicate an action. In some examples, the model is in the form of an actor network such as that shown in FIG. 2 with at least two layers, such as one with five-layers.

The action indicated by the model is either a compress action, a stretch action, or a normal playback action. Based upon the action, the playback duration of the media frame is determined. If the action is a compress action, then at operation 570 the frame is decoded and is processed (e.g., caused to be played back or some other operation) with a compress action being taken to decrease the amount of time the frame is played out. If the action is a stretch action, then at operation 575 the frame is decoded and is processed (e.g., caused to be played back or some other operation) with a stretch action being taken to increase the amount of time the frame is played out. If the action is normal playback, then at operation 580, the frame is decoded and processed (e.g., caused to be played back or some other operation) with the frame being played out as normal. At operation 585, if there are more packets in the streaming session, then processing proceeds to operation 510 to process the next data packet. In some examples, portions of the operations may be executed in parallel.

For example, a process may receive and place packets in a buffer and then move the packets to the jitter buffer as appropriate. Another process may then identify the jitter-buffer state and network state and execute the model. Another process may decode the media, and the like. As described in FIG. 5, the reward function and the critic network may not be utilized when using the model in real time.

In other examples, the model may be continuously updated, including calculating the reward, the value by the critic network (FIG. 2), and the loss function—which may be utilized to continually refine the model through backpropagation and other techniques.

Figure 6:
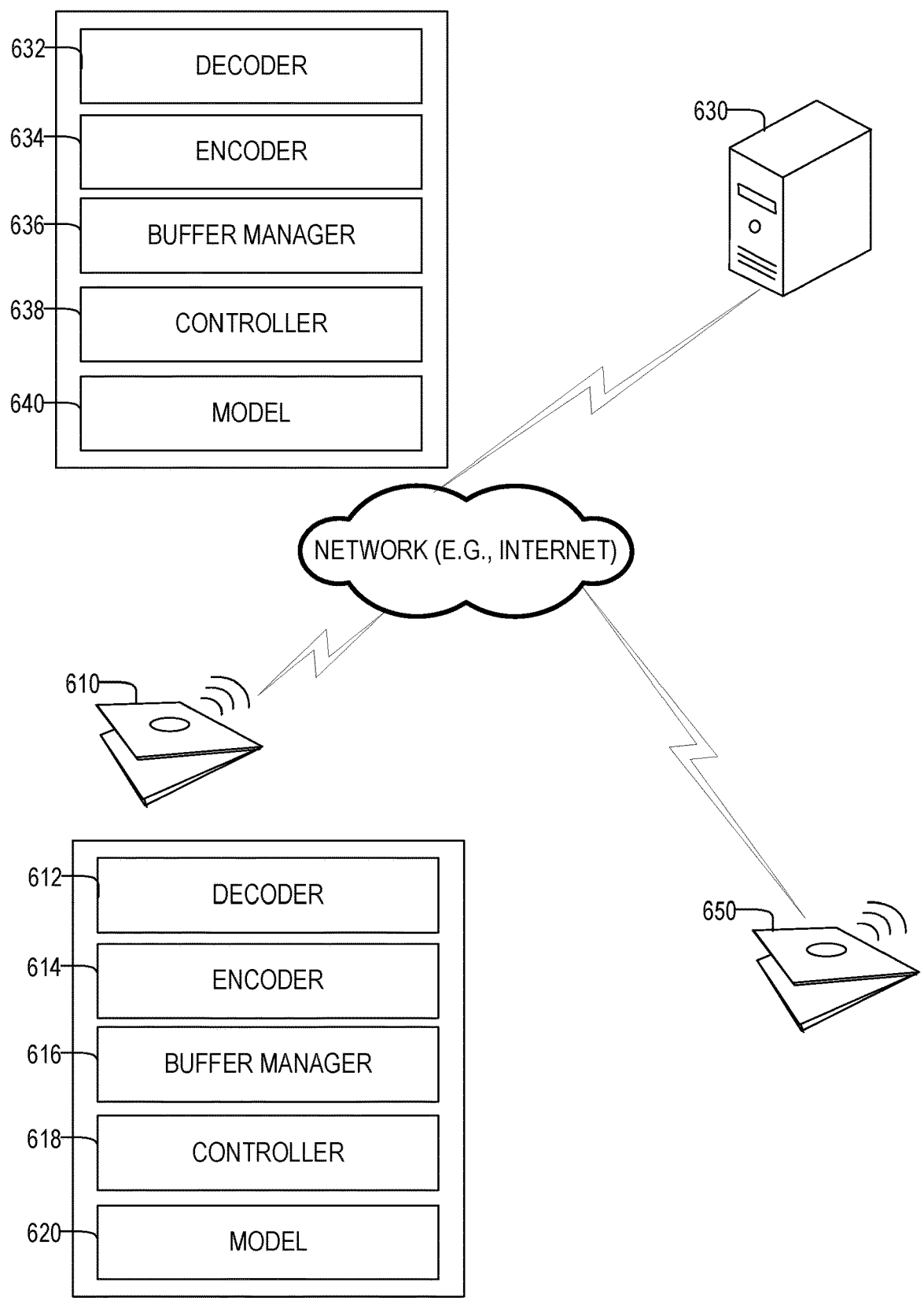
FIG. 6 illustrates a system diagram of a streaming system according to some examples of the present disclosure.

FIG. 6 illustrates a system diagram of a streaming system according to some examples of the present disclosure. Media may stream from a source computing device to a destination computing device. For example, a source computing device 610 may stream media over a network to a destination computing device 650. In examples in which the streaming is bi-directional, such as a conference call, VoIP call, or the like, the destination computing device 650 may also be a source device and the computing device 610 may also be a destination computing device. In some examples, a server computing device 630 may facilitate the communication, such as by providing a communication service. For example, server computing device 630 may provide an online meeting service.

Computing device 610 may include a controller 618 which may receive packets from another computing device over a network. The packets may include encoded media, such as audio, video, or audio/video. The media may be included in the packets and may be encoded. Decoder 612 may decode the packets into raw audio, video, or audio/video. Buffer manager 616 may manage one or more packet buffers and jitter buffers. For example, the buffer manager 616 may allocate and manage the data structures of one or more packet and/or jitter buffers; place items in the buffers; remove items from the buffers; perform other management tasks with respect to the buffers; and the like. Controller 618 may pass encoded media frames of received packets to the buffer manager 616 to buffer into a jitter buffer. Controller 618 may instruct decoder 612 to decode media frames in the jitter buffer and cause playout of media frames in the jitter buffer according to the decision of the model 620. The controller 618 may determine the buffer state and the network state and may pass this as input to the model 620. Model 620 may execute a neural network or other machine-learned model such as those that were described herein to produce an action. Actions include, compress frame, stretch frame, and normal playback of frame. During the playout of the media, controller 618 either compresses the current frame, stretches the current frame, or plays the current media frame back in the normal amount of time and normal speed. The selected action then affects the jitter-buffer delay, which in turn acts as feedback on the model for the decision on the next frame.

As previously noted, in some examples, the buffer manager 616 may have a separate packet buffer to buffer received packets prior to the controller 618 placing the packet contents (e.g., media frames) into the jitter buffer. Encoder 614 may be used where the streaming is bi-directional. The controller 618 may receive media frames to transmit and may instruct the encoder 614 to encode the frames. The encoded frames are then packetized and transmitted to the recipient device.

Audio media may be caused to be played through speakers, headphones, or another audio reproduction device. Video media may be caused to be played on a display device. Audiovisual media may be played by playing the audio component through speakers and the video component may be displayed on a display device. Computing device 650 may be a recipient device and may include the same components performing same or similar functions as computing device 610.

Server computing device 630 may also include a decoder 632, encoder 634, buffer manager 636, controller 638, and model 640 which performs same or similar functions as decoder 612, encoder 614, buffer manager 616, controller 618, and model 620 respectively. As previously noted, in some examples, the server 630 may receive media packets from multiple sending computing devices, mix them together, then re-encode a combined media signal to one or more recipient computing devices—for example, for an online meeting. Computing device 650 may also include a corresponding instance of the components of computing device 610. For example, the computing device 650 may include a model and a jitter buffer and perform the method of FIG. 5 to process media.

Figure 7:
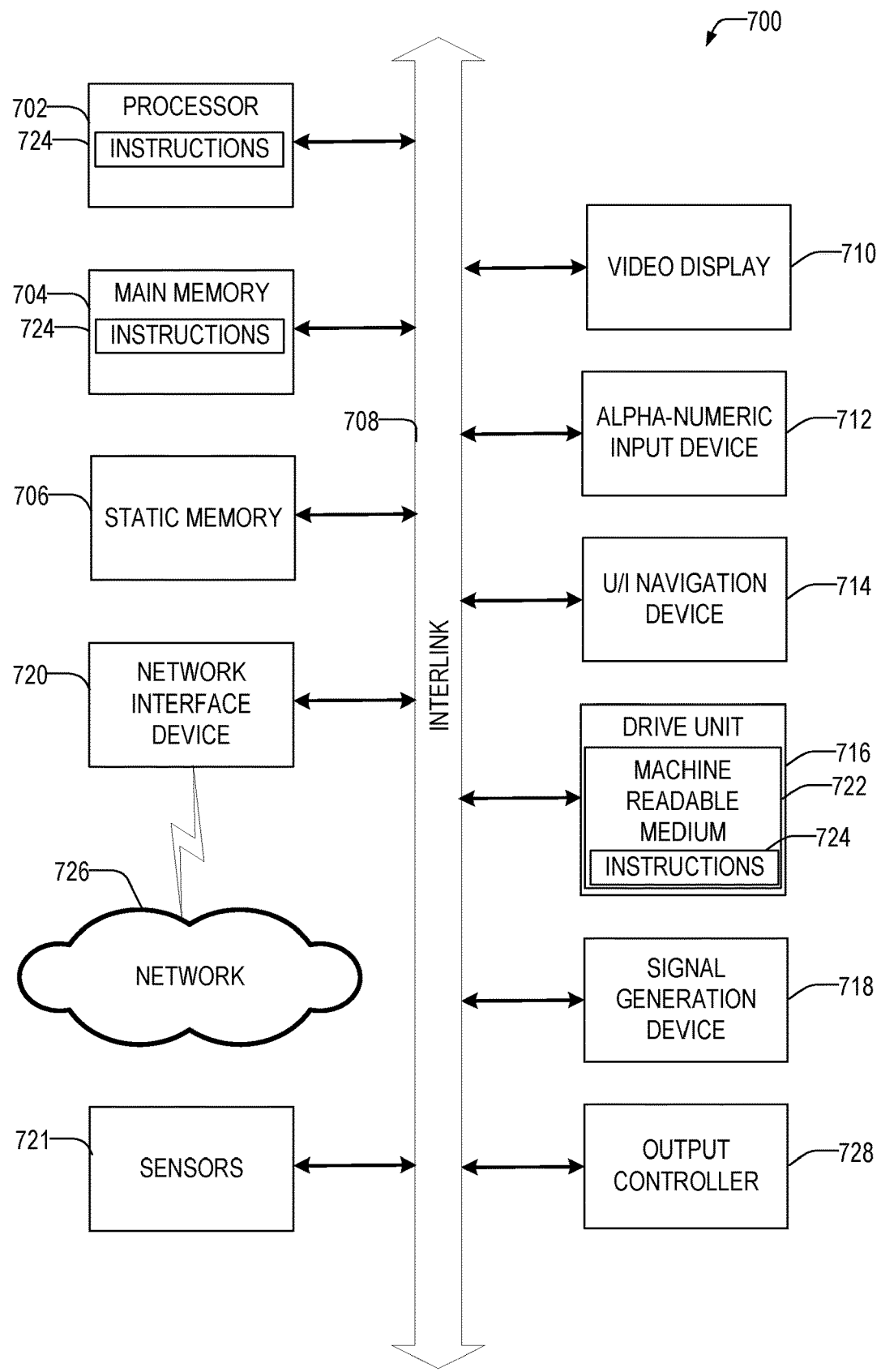
FIG. 7 illustrates a block diagram of an example machine upon which any one or more of the techniques (e.g., methodologies) discussed herein may be performed.

FIG. 7 illustrates a block diagram of an example machine 700 upon which any one or more of the techniques (e.g., methodologies) discussed herein may be performed. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a sending computing device, recipient computing device, personal computer (PC), a tablet PC, a set-top box (STB), a personal digital assistant (PDA), a mobile telephone, a server computing device, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 700 may implement the agent 110 (including one or more of the layers 210, 212, 214, 216, 218, 220, 222, 224, 226), simulator 120, computing device 610, 650, and 630 and the methods of FIGS. 3-5.

Examples, as described herein, may include, or may operate on, logic or a number of components, modules, or mechanisms (e.g., the various components of FIG. 6). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over a communications network 726 using a transmission medium via the network interface device 720. The Machine 700 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques.

Other Techniques and Examples

Example 1 is a device for controlling jitter-buffer delay in a media streaming session, the device comprising: a computer processor; a memory, storing instructions, which when executed by the computer processor causes the computer processor to perform operations comprising: identifying a jitter buffer state of a jitter buffer, the jitter buffer storing media data of an ongoing media streaming session taking place over a network, the media data stored in the jitter buffer prior to processing of the media data, the jitter buffer state comprising an indicator of a delay in processing of media data in the jitter buffer; identifying a network delay of the network; determining an action for a media frame of media data in the jitter buffer based upon the jitter buffer state and the network delay, the action a stretch, compress, or hold action; and determining a playback duration of the media frame based upon the action.

In Example 2, the subject matter of Example 1 includes, wherein the operations of determining the action for the frame of media data in the jitter buffer based upon the jitter buffer state and network delay comprises determining the action for the frame of media data based upon past jitter buffer states, past network states, past actions.

In Example 3, the subject matter of Examples 1-2 includes, wherein the jitter buffer state comprises a current jitter buffer delay, current received frames in the jitter buffer, total delay of the media frame, whether the media frame is concealed or not, whether the media frame is newly received, and a previously taken action.

In Example 4, the subject matter of Examples 1-3 includes, wherein the operations of determining the action for the frame of media data in the jitter buffer based upon the jitter buffer state and network delay comprises determining the action by using a model trained using past network traces of previous media streaming sessions.

In Example 5, the subject matter of Example 4 includes, wherein the operations further comprise: training the model by: simulating a jitter buffer using the past network traces; producing a training action using the model for the simulated jitter buffer; producing an estimated value of the training action using a second model; and modifying the model based upon the estimated value and a reward signal.

In Example 6, the subject matter of Example 5 includes, wherein the model and second model share a layer.

In Example 7, the subject matter of Examples 4-6 includes, wherein the model comprises at least two layers wherein at least one layer includes a leaky rectified linear unit activation function.

In Example 8, the subject matter of Examples 4-7 includes, wherein the model comprises: a first layer that comprises a leaky rectified linear unit (ReLu) activation function; a second layer that comprises a leaky ReLu activation function; a third layer that comprises a gated recurrent unit (GRU); a fourth layer that comprises a leaky ReLu activation function; and a fifth layer implementing a soft-max function.

In Example 9, the subject matter of Examples 1-8 includes, wherein the operations further comprise playing back the media frame at the playback duration.

In Example 10, the subject matter of Examples 1-9 includes, wherein the operations of determining the action for the frame of media data in the jitter buffer based upon the jitter buffer state and network delay comprises using a machine-learned model, and wherein the operations further comprise: producing an estimated value of the action using a second model; and modifying the model based upon the estimated value and a reward signal.

In Example 11, the subject matter of Examples 1-10 includes, wherein the media data comprises audio data, video data, or both audio and video data.

Example 12 is a method for controlling jitter-buffer delay in a media streaming session, the method comprising: identifying a jitter buffer state of a jitter buffer, the jitter buffer storing media data of an ongoing media streaming session taking place over a network, the media data stored in the jitter buffer prior to processing of the media data, the jitter buffer state comprising an indicator of a delay in processing of media data in the jitter buffer; identifying a network delay of the network; determining an action for a media frame of media data in the jitter buffer based upon the jitter buffer state and the network delay, the action a stretch, compress, or hold action; and determining a playback duration of the media frame based upon the action.

In Example 13, the subject matter of Example 12 includes, wherein determining the action for the frame of media data in the jitter buffer based upon the jitter buffer state and network delay comprises determining the action for the frame of media data based upon past jitter buffer states, past network states, past actions.

In Example 14, the subject matter of Examples 12-13 includes, wherein the jitter buffer state comprises a current jitter buffer delay, current received frames in the jitter buffer, total delay of the media frame, whether the media frame is concealed or not, whether the media frame is newly received, and a previously taken action.

In Example 15, the subject matter of Examples 12-14 includes, wherein determining the action for the frame of media data in the jitter buffer based upon the jitter buffer state and network delay comprises determining the action by using a model trained using past network traces of previous media streaming sessions.

In Example 16, the subject matter of Example 15 includes, training the model by: simulating a jitter buffer using the past network traces; producing a training action using the model for the simulated jitter buffer; producing an estimated value of the training action using a second model; and modifying the model based upon the estimated value and a reward signal.

In Example 17, the subject matter of Example 16 includes, wherein the model and second model share a layer.

In Example 18, the subject matter of Examples 15-17 includes, wherein the model comprises at least two layers wherein at least one layer includes a leaky rectified linear unit activation function.

In Example 19, the subject matter of Examples 15-18 includes, wherein the model comprises: a first layer that comprises a leaky rectified linear unit (ReLu) activation function; a second layer that comprises a leaky ReLu activation function; a third layer that comprises a gated recurrent unit (GRU); a fourth layer that comprises a leaky ReLu activation function; and a fifth layer implementing a soft-max function.

In Example 20, the subject matter of Examples 12-19 includes, playing back the media frame at the playback duration.

In Example 21, the subject matter of Examples 12-20 includes, wherein determining the action for the frame of media data in the jitter buffer based upon the jitter buffer state and network delay comprises using a machine-learned model, and wherein the method further comprises: producing an estimated value of the action using a second model; and modifying the model based upon the estimated value and a reward signal.

In Example 22, the subject matter of Examples 12-21 includes, wherein the media data comprises audio data, video data, or both audio and video data.

Example 23 is a machine-readable medium, storing instructions for controlling jitter-buffer delay in a media streaming session, the instructions, when executed by a machine, cause the machine to perform operations comprising: identifying a jitter buffer state of a jitter buffer, the jitter buffer storing media data of an ongoing media streaming session taking place over a network, the media data stored in the jitter buffer prior to processing of the media data, the jitter buffer state comprising an indicator of a delay in processing of media data in the jitter buffer; identifying a network delay of the network; determining an action for a media frame of media data in the jitter buffer based upon the jitter buffer state and the network delay, the action a stretch, compress, or hold action; and determining a playback duration of the media frame based upon the action.

In Example 24, the subject matter of Example 23 includes, wherein the operations of determining the action for the frame of media data in the jitter buffer based upon the jitter buffer state and network delay comprises determining the action for the frame of media data based upon past jitter buffer states, past network states, past actions.

In Example 25, the subject matter of Examples 23-24 includes, wherein the jitter buffer state comprises a current jitter buffer delay, current received frames in the jitter buffer, total delay of the media frame, whether the media frame is concealed or not, whether the media frame is newly received, and a previously taken action.

In Example 26, the subject matter of Examples 23-25 includes, wherein the operations of determining the action for the frame of media data in the jitter buffer based upon the jitter buffer state and network delay comprises determining the action by using a model trained using past network traces of previous media streaming sessions.

In Example 27, the subject matter of Example 26 includes, wherein the operations further comprise: training the model by: simulating a jitter buffer using the past network traces; producing a training action using the model for the simulated jitter buffer; producing an estimated value of the training action using a second model; and modifying the model based upon the estimated value and a reward signal.

In Example 28, the subject matter of Example 27 includes, wherein the model and second model share a layer.

In Example 29, the subject matter of Examples 26-28 includes, wherein the model comprises at least two layers wherein at least one layer includes a leaky rectified linear unit activation function.

In Example 30, the subject matter of Examples 26-29 includes, wherein the model comprises: a first layer that comprises a leaky rectified linear unit (ReLu) activation function; a second layer that comprises a leaky ReLu activation function; a third layer that comprises a gated recurrent unit (GRU); a fourth layer that comprises a leaky ReLu activation function; and a fifth layer implementing a soft-max function.

In Example 31, the subject matter of Examples 23-30 includes, wherein the operations further comprise playing back the media frame at the playback duration.

In Example 32, the subject matter of Examples 23-31 includes, wherein the operations of determining the action for the frame of media data in the jitter buffer based upon the jitter buffer state and network delay comprises using a machine-learned model, and wherein the operations further comprise: producing an estimated value of the action using a second model; and modifying the model based upon the estimated value and a reward signal.

In Example 33, the subject matter of Examples 23-32 includes, wherein the media data comprises audio data, video data, or both audio and video data.

Example 34 is a device for controlling jitter-buffer delay in a media streaming session, the device comprising: means for identifying a jitter buffer state of a jitter buffer, the jitter buffer storing media data of an ongoing media streaming session taking place over a network, the media data stored in the jitter buffer prior to processing of the media data, the jitter buffer state comprising an indicator of a delay in processing of media data in the jitter buffer; means for identifying a network delay of the network; means for determining an action for a media frame of media data in the jitter buffer based upon the jitter buffer state and the network delay, the action a stretch, compress, or hold action; and means for determining a playback duration of the media frame based upon the action.

In Example 35, the subject matter of Example 34 includes, wherein the means for determining the action for the frame of media data in the jitter buffer based upon the jitter buffer state and network delay comprises means for determining the action for the frame of media data based upon past jitter buffer states, past network states, past actions.

In Example 36, the subject matter of Examples 34-35 includes, wherein the jitter buffer state comprises a current jitter buffer delay, current received frames in the jitter buffer, total delay of the media frame, whether the media frame is concealed or not, whether the media frame is newly received, and a previously taken action.

In Example 37, the subject matter of Examples 34-36 includes, wherein the means for determining the action for the frame of media data in the jitter buffer based upon the jitter buffer state and network delay comprises means for determining the action by using a model trained using past network traces of previous media streaming sessions.

In Example 38, the subject matter of Example 37 includes, means for training the model by: means for simulating a jitter buffer using the past network traces; means for producing a training action using the model for the simulated jitter buffer; means for producing an estimated value of the training action using a second model; and means for modifying the model based upon the estimated value and a reward signal.

In Example 39, the subject matter of Example 38 includes, wherein the model and second model share a layer.

In Example 40, the subject matter of Examples 37-39 includes, wherein the model comprises at least two layers wherein at least one layer includes a leaky rectified linear unit activation function.

In Example 41, the subject matter of Examples 37-40 includes, wherein the model comprises: a first layer that comprises a leaky rectified linear unit (ReLu) activation function; a second layer that comprises a leaky ReLu activation function; a third layer that comprises a gated recurrent unit (GRU); a fourth layer that comprises a leaky ReLu activation function; and a fifth layer implementing a soft-max function.

In Example 42, the subject matter of Examples 34-41 includes, means for playing back the media frame at the playback duration.

In Example 43, the subject matter of Examples 34-42 includes, wherein the means for determining the action for the frame of media data in the jitter buffer based upon the jitter buffer state and network delay comprises means for using a machine-learned model, and wherein the device further comprises: means for producing an estimated value of the action using a second model; and means for modifying the model based upon the estimated value and a reward signal.

In Example 44, the subject matter of Examples 34-43 includes, wherein the media data comprises audio data, video data, or both audio and video data.

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

What is claimed is:

1. A device for controlling jitter-buffer delay in a media streaming session over a network, the device comprising:
   a computer processor;
   a memory, storing instructions, which when executed by the computer processor causes the computer processor to perform operations comprising:
   identifying a jitter buffer state of a jitter buffer, the jitter buffer storing media frames of a media streaming session, the jitter buffer state comprising a current jitter buffer delay, current received frames in the jitter buffer, total delay of a current media frame of the media frames, and an immediately previous action;
   identifying a network delay of the network;
   determining an action for a media frame of media data in the jitter buffer based upon the jitter buffer state, the network delay, and a reward; and
   determining a playback duration of a next media frame based upon the action.

2. The device of claim 1, wherein the operations of determining the action for the media frame in the jitter buffer based upon the jitter buffer state and the network delay comprises determining the action for the media frame based upon past jitter buffer states, past network states, and past actions.

3. The device of claim 1, wherein the jitter buffer state further comprises, whether the media frame is concealed or not, and whether the media frame is newly received.

4. The device of claim 1, wherein the operations of determining the action for the media frame in the jitter buffer based upon the jitter buffer state and the network delay comprises determining the action by using a model trained using past network traces of previous media streaming sessions.

5. The device of claim 4, wherein the operations further comprise:
   training the model by:
   simulating a jitter buffer using the past network traces;
   producing a training action using the model for the simulated jitter buffer;
   producing an estimated value of the training action using a second model; and
   modifying the model based upon the estimated value and the reward.

6. The device of claim 5, wherein the model and second model share a neural network layer.

7. The device of claim 4, wherein the model comprises at least two layers wherein at least one layer includes a leaky rectified linear unit activation function.

8. The device of claim 4, wherein the model comprises:
a first layer that comprises a leaky rectified linear unit (ReLu) activation function;
a second layer that comprises a leaky ReLu activation function;
a third layer that comprises a gated recurrent unit (GRU);
a fourth layer that comprises a leaky ReLu activation function; and
a fifth layer implementing a soft-max function.

9. The device of claim 1, wherein the operations further comprise playing back the media frame at the playback duration.

10. The device of claim 1, wherein the operations of determining the action for the media frame based upon the jitter buffer state and the network delay comprises using a machine-learning model, and wherein the operations further comprise:
producing an estimated value of the action using a second model; and
modifying the model based upon the estimated value and the reward.

11. The device of claim 1, wherein the media frame comprises audio data, video data, or both audio and video data.

12. A method for controlling jitter-buffer delay in a media streaming session over a network, the method comprising:
identifying a jitter buffer state of a jitter buffer, the jitter buffer storing media frames of a media streaming session, the jitter buffer state comprising a current jitter buffer delay, current received frames in the jitter buffer, total delay of a current media frame of the media frames, and an immediately previous action;
identifying a network delay of the network;
determining an action for a media frame of media data in the jitter buffer based upon the jitter buffer state, the network delay, and a reward; and
determining a playback duration of a next media frame based upon the action.

13. The method of claim 12, wherein determining the action for the media frame in the jitter buffer based upon the jitter buffer state and the network delay comprises determining the action for the media frame based upon past jitter buffer states, past network states, and past actions.

14. The method of claim 12, wherein the jitter buffer state further comprises whether the media frame is concealed or not and whether the media frame is newly received.

15. The method of claim 12, wherein determining the action for the media frame in the jitter buffer based upon the jitter buffer state and the network delay comprises determining the action by using a model trained using past network traces of previous media streaming sessions.

16. The method of claim 15, further comprising:
training the model by:
simulating a jitter buffer using the past network traces;
producing a training action using the model for the simulated jitter buffer;
producing an estimated value of the training action using a second model; and
modifying the model based upon the estimated value and the reward.

17. The method of claim 12, wherein determining the action for the media frame in the jitter buffer based upon the jitter buffer state and the network delay comprises using a machine-learned model, and wherein the method further comprises:
producing an estimated value of the action using a second model; and
modifying the model based upon the estimated value and the reward.

18. The method of claim 12, wherein the media frame comprises audio data, video data, or both audio and video data.

19. A device for controlling jitter-buffer delay in a media streaming session over a network, the device comprising:
means for identifying a jitter buffer state of a jitter buffer, the jitter buffer storing media frames of a media streaming session, the jitter buffer state comprising a current jitter buffer delay, current received frames in the jitter buffer, total delay of a current media frame of the media frames, and an immediately previous action;
means for identifying a network delay of the network;
means for determining an action for a media frame of media data in the jitter buffer based upon the jitter buffer state, the network delay, and a reward; and
means for determining a playback duration of a next media frame based upon the action.

20. The device of claim 19, wherein the means for determining the action for the media frame in the jitter buffer based upon the jitter buffer state and the network delay comprises means for determining the action for the media frame based upon past jitter buffer states, past network states, and past actions.

* * * * *